US008840820B2

(12) United States Patent
Yancey et al.

(10) Patent No.: US 8,840,820 B2

(45) Date of Patent: Sep. 23, 2014

(54) FOAMED BINDER AND ASSOCIATED SYSTEMS AND METHODS FOR PRODUCING A WOOD PRODUCT

(75) Inventors: Michael J. Yancey, Puyallup, WA (US); Travis E. Bjorkman, Bonney Lake, WA (US); Jack G. Winterowd, Puyallup, WA (US)

(73) Assignee: Weyerhaeuser NR Company, Federal Way, WA (US)

(*) Notice: Subject to any disclaimer, the term of this patent is extended or adjusted under 35 U.S.C. 154(b) by 411 days.

(21) Appl. No.: 12/729,098

(22) Filed: Mar. 22, 2010

(65) Prior Publication Data

US 2010/0244300 A1 Sep. 30, 2010

Related U.S. Application Data

(60) Provisional application No. 61/163,799, filed on Mar. 26, 2009.

(51) Int. Cl.

| | |
|---|---|
| ***B29C 44/12*** | (2006.01) |
| ***B32B 5/12*** | (2006.01) |
| ***C08J 9/30*** | (2006.01) |
| ***B29C 44/34*** | (2006.01) |
| ***C08J 9/00*** | (2006.01) |
| *B05C 3/08* | (2006.01) |

(52) U.S. Cl.

CPC ......... *B29C 44/3461* (2013.01); *C08J 2361/06* (2013.01); *C08J 9/30* (2013.01); *B05C 3/08* (2013.01); *C08J 2401/00* (2013.01); *C08J 9/0061* (2013.01)

USPC ............ 264/50; 264/45.1; 264/45.3; 428/107

(58) Field of Classification Search

USPC .......................... 264/50, 45.1, 45.3; 428/107

See application file for complete search history.

(56) References Cited

U.S. PATENT DOCUMENTS

| | | | | |
|---|---|---|---|---|
| 3,639,303 A * | 2/1972 | Penfold | ......................... | 521/181 |
| 4,252,908 A * | 2/1981 | Paladini | ......................... | 521/117 |
| 4,514,532 A * | 4/1985 | Hsu et al. | ......................... | 524/14 |
| 5,057,591 A | 10/1991 | Detlefsen et al. | | |
| 5,234,969 A | 8/1993 | Clark et al. | | |
| 5,324,590 A * | 6/1994 | Nylund et al. | ................ | 428/524 |
| 5,736,218 A | 4/1998 | Iwata et al. | | |
| 5,914,153 A * | 6/1999 | Swink et al. | .................. | 427/242 |
| 2005/0173089 A1* | 8/2005 | Liang et al. | ................... | 162/218 |
| 2006/0058446 A1* | 3/2006 | Manka et al. | ................. | 524/502 |
| 2006/0091577 A1* | 5/2006 | Shen et al. | .................... | 264/109 |
| 2010/0244300 A1* | 9/2010 | Yancey et al. | ............... | 264/45.3 |

* cited by examiner

*Primary Examiner* — Jeremiah Smith

(74) *Attorney, Agent, or Firm* — Christensen O'Connor Johnson Kindness PLLC

(57) ABSTRACT

The disclosure relates to foamed binders for wood strand products and methods and systems for producing wood strand products using foamed binders. In some embodiments, the disclosure includes a method for producing a wood strand product from cellulosic particles, the method comprising the steps of foaming a phenol formaldehyde binder to produce a foam, tumbling the cellulosic particles in a rotary blender, applying the foam to the cellulosic particles in the rotary blender, blending the cellulosic particles and the foam so that the foam covers the cellulosic particles, and consolidating the cellulosic particles under heat and pressure.

16 Claims, 5 Drawing Sheets

406
416
Foamed Resin Applicator
Foamed Resin Spray
Wood Strand Blender
Compressed Air
414
Foamed Resin
Mixing Head
Mixer Drive Unit
404
402
408
410
412
Surfactant Tank
Surfactant Pump
Additive Tank
Additive Pump
Resin Tank
Resin Pump

FOAMED BINDER AND ASSOCIATED SYSTEMS AND METHODS FOR PRODUCING A WOOD PRODUCT

CROSS-REFERENCE TO RELATED APPLICATION

This application is entitled to and claims the benefit of priority under 35 U.S.C. §119 from U.S. Provisional Patent Application Ser. No. 61/163,799 filed Mar. 26, 2009, and titled "Foamed Binder and Associated Systems and Methods for Producing a Wood Product," the contents of which are incorporated herein by reference.

TECHNICAL FIELD

The present disclosure is directed generally to foamed binders for wood strand products and methods and systems for producing wood strand products using foamed binders.

BACKGROUND

Rising demand for wood products and depletion of virgin forests has led to a search for more efficient uses of harvested timber and to the development of engineered wood products as alternatives to natural solid wood products. An early example of such an alternative product is particleboard. Particleboard is manufactured from cellulosic materials, primarily in the form of discrete particles which are combined with a resin, wax, adhesive or other suitable binder and then consolidated under heat and pressure.

More recent developments of engineered wood products include wood strand products such as oriented strand board, oriented strand lumber, parallel strand lumber. A primary difference between particleboard and wood strand products is the particle geometry used in production. The particles used to make wood strand products are generally larger and may be cut to specific dimensions or oriented in a manner to impart strength and durability, thereby more closely mimicking the mechanical properties and appearance of natural solid wood. In addition, there are a number of other significant differences between the manufacturing processes, materials, recipes, and formulations used to make particleboard and those used to make wood strand products.

A known process for making engineered wood products is depicted schematically in FIG. 1. Although this process may generally apply to both particleboard and wood strand products, there are significant manufacturing, formulation, compositional and process differences between the two products. Referring to FIG. 1, wooden logs are cut into smaller wood elements as depicted by the schematic step 102. The size of the wood elements may vary depending on whether particleboard or a wood strand product is being produced. For example, wood elements suitable for particleboard may be about 0.125 inches in diameter, whereas suitable wood elements for wood strand products may be approximately 0.75 inches to 1 inch wide, 3 inches to 12 inches long, and 0.025 inches to 0.050 inches thick. A mixing device is used to apply a resin, adhesive, or another suitable binder to the wood elements as depicted in schematic step 106. After the binder is applied, the wood elements are formed into a mat as shown in schematic step 108 and the mat is consolidated under heat and pressure as shown in schematic step 110. In most processes, the wood elements are subjected to a drying step (e.g., schematic step 104) at some point prior to the consolidation to ensure the proper moisture content (schematic step 108).

One significant difference between manufacturing particleboard and manufacturing wood strand products occurs in schematic step 106. In particleboard manufacturing, a screw-type blender is used often in schematic step 106. Particleboard blenders are typically tubes which are about 1 foot to about 3 feet in diameter and about 8 feet to about 15 feet long. The wood elements are moved through the tube by a screw, and injection nozzles or spray tips located at various locations along a spinning screw shaft within the tube are used to apply the binder. The friction resulting from the movement of the screw generates heat; therefore, large chilling units are often required to keep the blender cool. A chilled metal shell may also be used to prevent adhesive build-up and clogging of the tune due to moisture condensation on the tube wall.

In wood strand product manufacturing, a drum-type blender is used in schematic step 106. Because the particles used to make wood strand products are significantly larger and have a different geometry than the particles used to make particle board, a screw-type blender would likely shred and tear the strands used for wood strand products. Wood strand product blenders are rotating drums which are about 8 feet to about 12 feet in diameter and about 25 feet to about 35 feet in length. Spinning/rotating atomizers, spray tips, nozzles or other application devices suspended along the drum axis apply the binder to the wood elements which are tumbled by the movement of the drum. Examples of such devices are provided in U.S. Pat. No. 5,914,153, which is hereby incorporated by reference. The tumbling action created by the drum's rotation increases the likelihood that a strand will pass by the application device thereby enhancing binder distribution among the wood elements. Generally no chilling equipment is required during the binder application process in a wood strand product application.

The binders used to make wood strand products are generally supplied to manufacturers as small molecules, oligomers, or relatively low molecular weight resins, which are not capable of supporting substantial loads or stresses without further polymerization. Conventional binders may be applied to the wood elements in the form of water-based liquid solutions, non-aqueous liquids, or powders. The term "curing" is used to describe the conversion of the many relatively small molecules into fewer larger, cross-linked polymer molecules that often exist as networks and are capable of resisting applied loads. This conversion process is dependent upon the ability of a substantial number of the relatively small molecules to form covalent bonds with at least two (and preferably more) other small molecules. The rate at which these covalent bonds are formed must be relatively fast in order to accommodate most commercial applications. Prior to the curing process there is typically some level of penetration or absorption of the binder into the wooden particles. Powdered binders that are used to make wood composites actually melt when they initially heated. A portion of the molten binder absorbs into the wood and continued heating of these resins causes curing. When two wooden particles are held together with external forces or pressure, and a layer of wet binder exists at the interface between the two particles, and a portion of the binder has absorbed or penetrated some sufficient depth into each of the wood particles, then the curing action of the binder results in a mechanical connection (or "bond") between the two particles. These bonds allow structural loads to be effectively transferred from one particle to another within a wood composite product.

The binders used to manufacture of wood strand products significantly impact the properties of the resulting product. Suitable binders generally include phenol formaldehyde binders, urea formaldehyde binders, polymeric diphenylmethane diisocyanate (pMDI), MDI, and others. Many factors are involved in adhesive selection for a particular application. One significant issue wood strand product manufacturers face is cost. pMDI and MDI are significantly more expensive than urea formaldehyde binders and phenol formaldehyde binders. In situations where phenol formaldehyde binders are used, urea is often added to lower the free formaldehyde content and/or to decrease the viscosity. This addition increases the overall cost of the binder.

Another factor manufacturers must consider is the impact of the adhesive on the blender equipment. Phenol formaldehyde binders may cause build-up in the blender; whereas pMDI and MDI cause relatively less build-up when compared to phenol formaldehyde binders. This is because, among other reasons, in pMDI/MDI applications have a lower prepress tack and a higher particle to binder ration when compared to other phenol formaldehyde binders. The formation of build-up may require shut down of equipment for clean up, maintenance, or replacement of parts; therefore, the binder's effect on the blending equipment can have a significant impact on overall cost and efficiency of production.

Because engineered wood products are often intended to function in place of natural solid wood, manufacturing products with mechanical properties close to that of natural wood is highly desirable. In most cases it is desirable to maximize the strength of the bonds between the wood particles, which tends to increase the strength of wood product up to the limit of the inherent strength of the wooden particles. One known solution to strengthen the internal bonds between the particles in wood products is to add more binder in the manufacturing process. Simply adding more binder helps increase the coverage on the wood elements, thereby increasing the internal bond are and strength between the particles. One drawback of this solution is that binders are expensive and adding more binder also adds significant costs to the manufacturing process.

U.S. Pat. No. 5,324,590 discloses a particleboard produced by coating particles of wood furnish with an adhesive comprising a foamed mixture of 96-98% urea formaldehyde and 2-4% by weight dried animal blood. The mixture is foamed to about 5-15 times the volume of the liquid binder to provide a urea formaldehyde solids content of 45-70% by weight. A foamed binder is expected to help increase the binder coverage over the particles while at the same time reducing the overall volume of binder needed for the operation.

U.S. Pat. No. 5,324,590 discloses a foamed binder for a particleboard application, but the solution would likely not be suitable in a wood strand product application. Thus, there is a need to develop a method for making a wood strand product that provides uniform binder coverage on the particles while at the same time minimizing the binder's cost. There is also a need to develop a method for making a wood strand product that uses a foamed binder that will increase the internal bond strength of the particles in the wood strand product when compared with the use of a conventional non-foamed binder. There is also a need to develop a method for making a wood strand product that has minimal adverse effects on blending equipment and requires minimal clean up and maintenance when compared with conventional methods.

SUMMARY

The following summary is provided for the benefit of the reader only and is not intended to limit in any way the disclosure. The present disclosure is directed generally towards foamed binders for wood strand products and methods and systems for producing wood strand products using foamed binders.

In some embodiments, the disclosure includes a method for producing a wood strand product from cellulosic particles. The method includes the steps of foaming a phenol formaldehyde binder to produce a foam, tumbling the cellulosic particles in a rotary blender, applying the foam to the cellulosic particles in the rotary blender, blending the cellulosic particles and the foam so that the foam covers the cellulosic particles, and consolidating the cellulosic particles under heat and pressure.

Further aspects of the disclosure are directed towards a foamed binder for production of a wood strand product comprising a phenol formaldehyde binder mixed with air and surfactant to form a foam. The foam has a caustic level of about 5.0% to about 8.0%.

In some embodiments, the disclosure includes a system for making a wood strand product. The system includes a binder pumping system, a foaming device configured to increase the volume of the binder by converting it to a foam, and a rotary drum blender configured to mix the foam with cellulosic particles so that the foam substantially covers the cellulosic particles. The wood strand product may be oriented strand board, oriented strand lumber, laminated strand lumber, and parallel strand lumber.

BRIEF DESCRIPTION OF THE DRAWINGS

The present disclosure is better understood by reading the following description of non-limitative embodiments with reference to the attached drawings wherein like parts of each of the figures are identified by the same reference characters, and are briefly described as follows.

DETAILED DESCRIPTION

The present disclosure describes foamed binders for wood strand products and methods and systems for producing wood strand products using foamed binders. Certain specific details are set forth in the following description and FIGS. 2-5 to provide a thorough understanding of various embodiments of the disclosure. Well-known structures, systems, and methods often associated with such systems have not been shown or described in details to avoid unnecessarily obscuring the description of various embodiments of the disclosure. In addition, those of ordinary skill in the relevant art will understand that additional embodiments of the disclosure may be practiced without several of the details described below.

In this disclosure, the term "wood" is used to refer to any organic material produced from trees, shrubs, bushes, grasses or the like. The disclosure is not intended to be limited to a particular species or type of wood. The term "wood strand product" is used to refer to a wood-based composite utilizing wood fibers, particles, reconstituted wood or another wood derivative (e.g., oriented strand board, oriented strand lumber, laminated strand lumber, parallel strand lumber, and other similar composites). The term “cellulosic particles” is used to refer to particles derived from wood used to form a wood composite. Cellulosic materials in this disclosure include, but are not limited to flakes, strands, chips, particles, fiber, large pieces of wood, or other similar materials. The term “binder” is used to refer to resins, adhesives, or other suitable materials for bonding cellulosic particles. The term “foamed” is used to refer to a process of agitating a liquid with a gas such as air, carbon dioxide, nitrogen, argon, or an equivalent (e.g., blowing agents) to create a froth or foam. In this disclosure, the terms “foam” and “froth” are used interchangeably.

Figure 1:
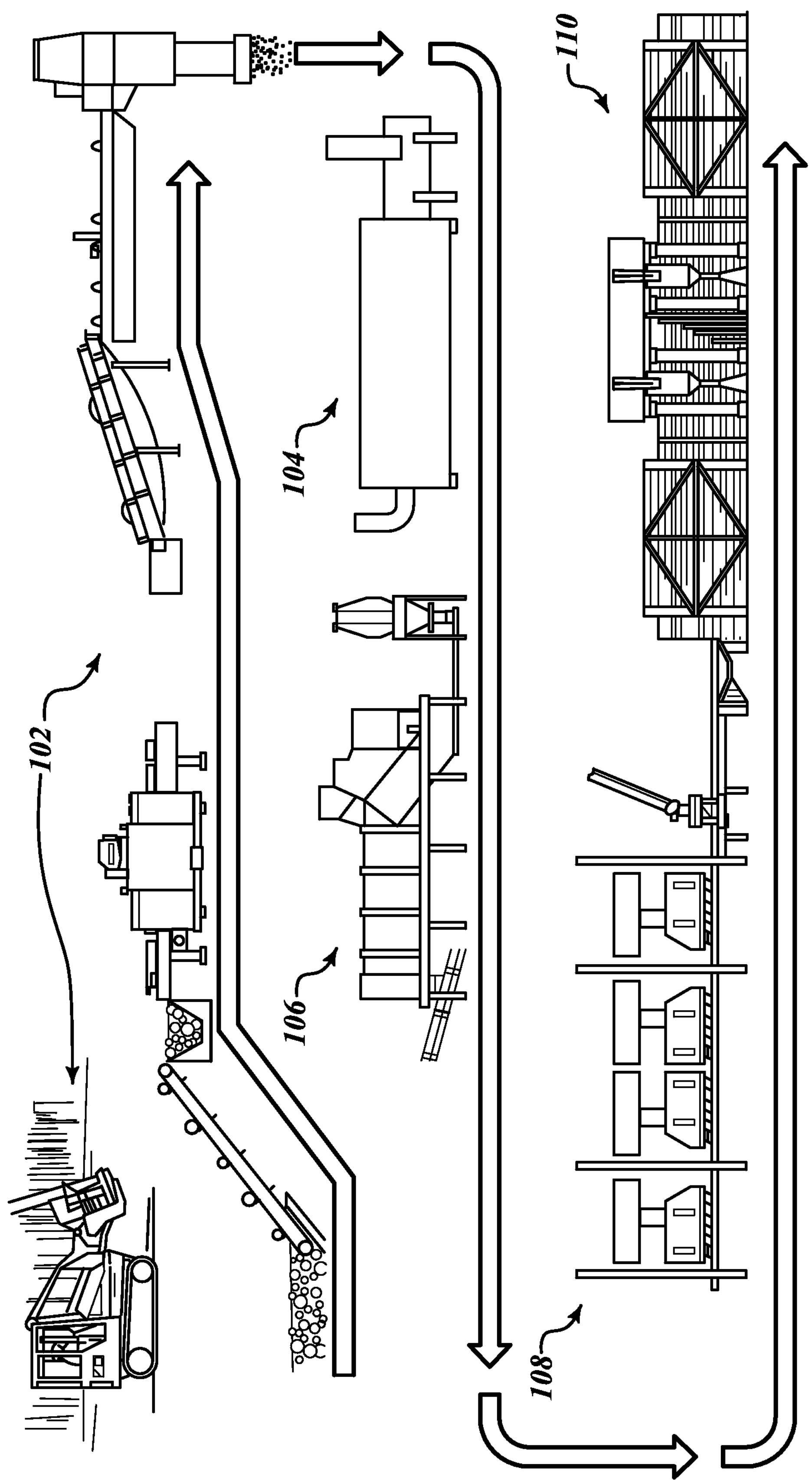
FIG. 1 is a schematic flow diagram for a process for making engineered wood products known in the art.
Figure 2:
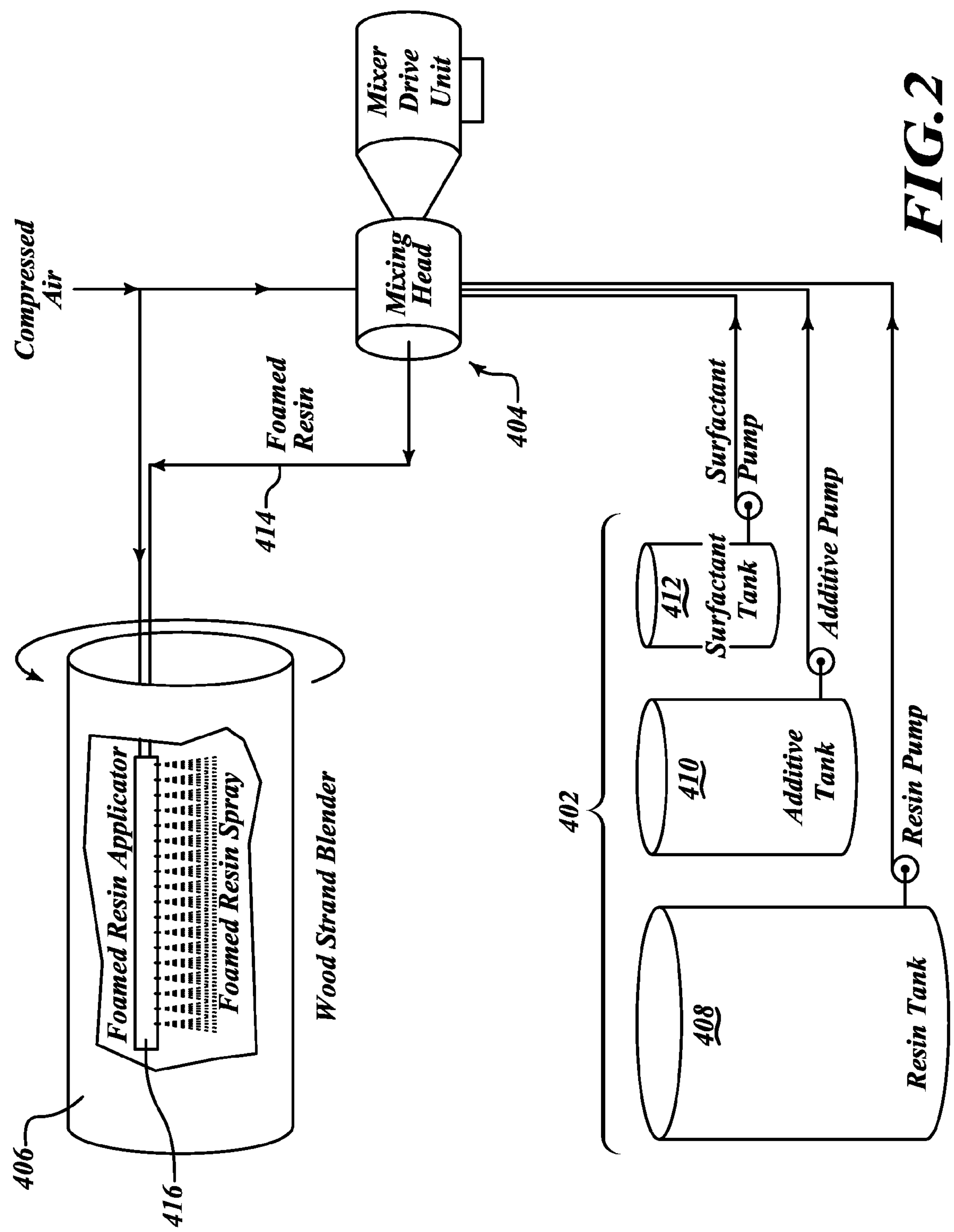
FIG. 2 is a schematic of a method for making a wood strand product according to some embodiments of the disclosure.
Figure 4:
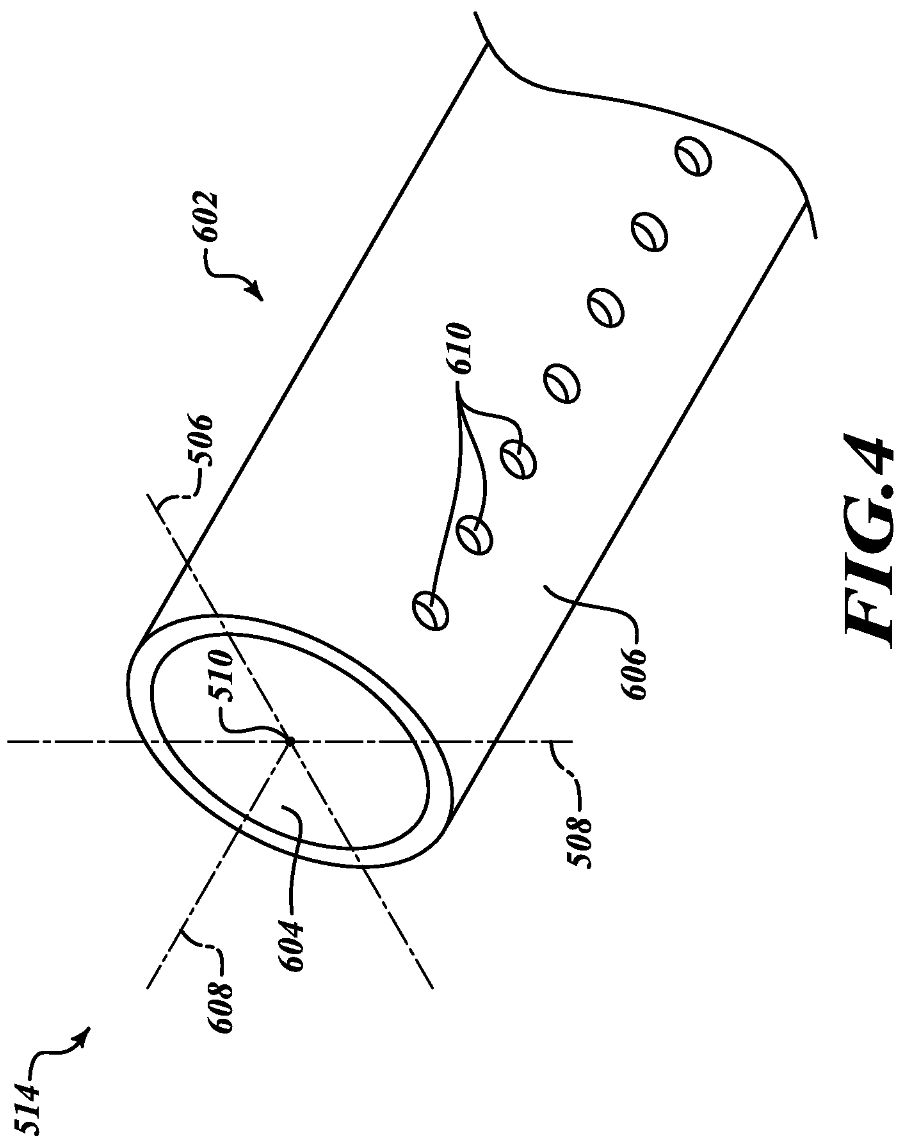
FIG. 4 is a schematic view of a binder delivery system that is part of the application device from FIG. 3.

A system for making wood strand products according to some embodiments of the disclosure is shown in FIG. 2. FIG. 2 includes a binder pumping system 402, a foaming device 404, and a blender 406. The binder pumping system 402 may be any conventional pumping device or equipment known in the art. In FIG. 4, a binder tank 408, an additive tank 410, and a surfactant tank 412 are shown. The content of each component of the binder pumping system 402 is pumped to the foaming device 404, and then applied to cellulosic particles (not shown) in the blender 406. In some embodiments, these tanks could be combined into a single tank or in any other configuration known to those skilled in the art.

The binder may be a phenol formaldehyde resin, urea formaldehyde resin, polymeric diphenylmethane diisocyanate (pMDI), MDI, or any other binder known in the art. Preferably, the binder is a phenol-formaldehyde resin. The binder may include aqueous resols, which have a pH level greater than about 7 and a formaldehyde/phenol molar ratio greater than about 1.0. Preferred phenol-formaldehyde binders are aqueous, have a pH level greater than about 8, a percent solids of about 35% to about 65%, a caustic level of about 5.0% to about 8.0% (solids basis), a formaldehyde to phenol molar ration of approximately 1.8 to 3.2, and a viscosity of about 1000 centipoises to about 4000 centipoises (as determined by use of a Brookfield Viscometer, #18 spindle, 20° C.). A small amount of urea (e.g., about 0.01% to about 35%) may be added to lower the free formaldehyde content. In some embodiments, no urea is added. It should be noted that the amount of urea added is small in comparison to conventional formulations resulting in an overall reduction in cost. Most highly preferred phenol-formaldehyde binders may include those that are aqueous, have a pH level greater than about 9, a percent solids of about 45% to about 55%, a caustic level of about 6.0% to about 7.5% (solids basis), a formaldehyde to phenol molar ration of approximately 2.3 to 2.8, a urea level of about 0.01% to about 4.0% (solids basis), and a viscosity of about 1500 centipoises to about 2500 centipoises (as determined by use of a Brookfield Viscometer, #18 spindle, 20° C.).

The foaming device 404 may be any conventional foaming equipment known in the art. An example of a suitable foaming device is the Oakes Continuous Mixing Head, which is commercially available from E.T. Oakes Corporation. According to some embodiments of the disclosure, a binder is pumped from the binder tank 408 into foaming device 404 where it is mixed with air or an equivalent gas and optionally a surfactant to produce a foam 414. The foam 414 has a volume that is significantly higher than that of the binder before entering the foaming device 404. In some embodiments, the foam 408 may have a volume that is at least 5 times greater than that of the binder before foaming. In other embodiments, the increase in volume is greater. Due to this increase in volume, some embodiments of the disclosure require a smaller amount of binder than conventional methods, which has a significant impact on the overall cost of the operation. The cost of the binder is also minimized because the urea content is relatively low when compared to conventional formulations. At the same time, foaming of the binder is expected to improve the coverage on the cellulosic particles when compared to conventional methods.

A surfactant may optionally be pumped from the surfactant tank 412 into the foaming device 404 to stabilize the foam 414. Surfactants are generally added to the phenol formaldehyde resin at a level of about 0.01% to about 3.0% prior to conversion of the resin into foam. Use of the surfactant in the foamed resin decreases the interfacial tension between the liquid resin and the gas bubbles that are dispersed throughout the resin, which substantially improves the stability of the foam. Surfactants suitable for this application may be cationic, anionic, amphoteric, or nonionic. Surfactants that are anionic, amphoteric or nonionic are preferred due to their compatibility with the alkaline phenol-formaldehyde resol resins that are typically utilized in this application. Anionic surfactants may include sulphates, sulphonates, phosphates and carboxylic acids. Examples of anionic surfactants include but are not limited to sodium lauryl sulphate, perfluorooctanesulphonate, sodium stearate, ammonium lignosulphonate, and sodium lauryl phosphate. Amphoteric surfactants can include proteins, such as lecithin, and betaines, such as cetyl betaine and cocamidopropyl betaine. Nonionic surfactants can include alkyl ethers, alkylphenol ethers, alkyl phenols, alkyl glucosides, fatty alcohols, polysorbates, and silicones. Examples of alkyl ethers are poly(ethylene glycol), poly(propylene glycol), and PEG-10 glyceryl stearate. An example of an alkylphenol ether is 4-octylphenol polyethoxylate. An example of an alkyl phenol is nonylphenol. An example of an alkyl glucoside is decyl glucoside. An example of a fatty alcohol is isostearyl alcohol. Examples of polysorbates include polyoxyethlene (20) sorbitan monolaurate and polyoxyethlene (20) sorbitan monopalmitate. Examples of silicone surfactants include various polysiloxanes, such as poly(dimethylsiloxane). In some embodiments, a surfactant is not used and the foam 408 is produced with only air or an equivalent.

Optionally other chemical additives in liquid or gas form may be added from the additive tank 410 to the binder while it is being processed in the foaming device 404. Suitable chemical additives include, but are not limited to catalysts, emulsifiers, wood preservatives, waxes, or other substances commonly used in the wood strand product manufacturing process.

After the binder is foamed in the foaming device 404, the resulting foam 414 is applied to the cellulosic particles in the blender 406. The blender 406 may be a rotary drum or other conventional mixing device used in the manufacture of wood strand products. According to the disclosure, the blender 406 may have one or more application devices 416 arranged at desired locations. The application devices 412 may be nozzles, pipes, spraying equipment, air knives, atomizers, a combination of these devices, or other devices capable of spraying, extruding, squirting, or otherwise applying the foam 414 to the cellulosic particles. The blender 406 rotates and tumbles the cellulosic particles as the application devices 416 apply the foam 414. The application of the foam 414 may be done using a controlled spray or otherwise directed to optimize coverage on the cellulosic particles. There may be several application devices 416 in the blender 406 or a single application device may be used.

Figure 3:
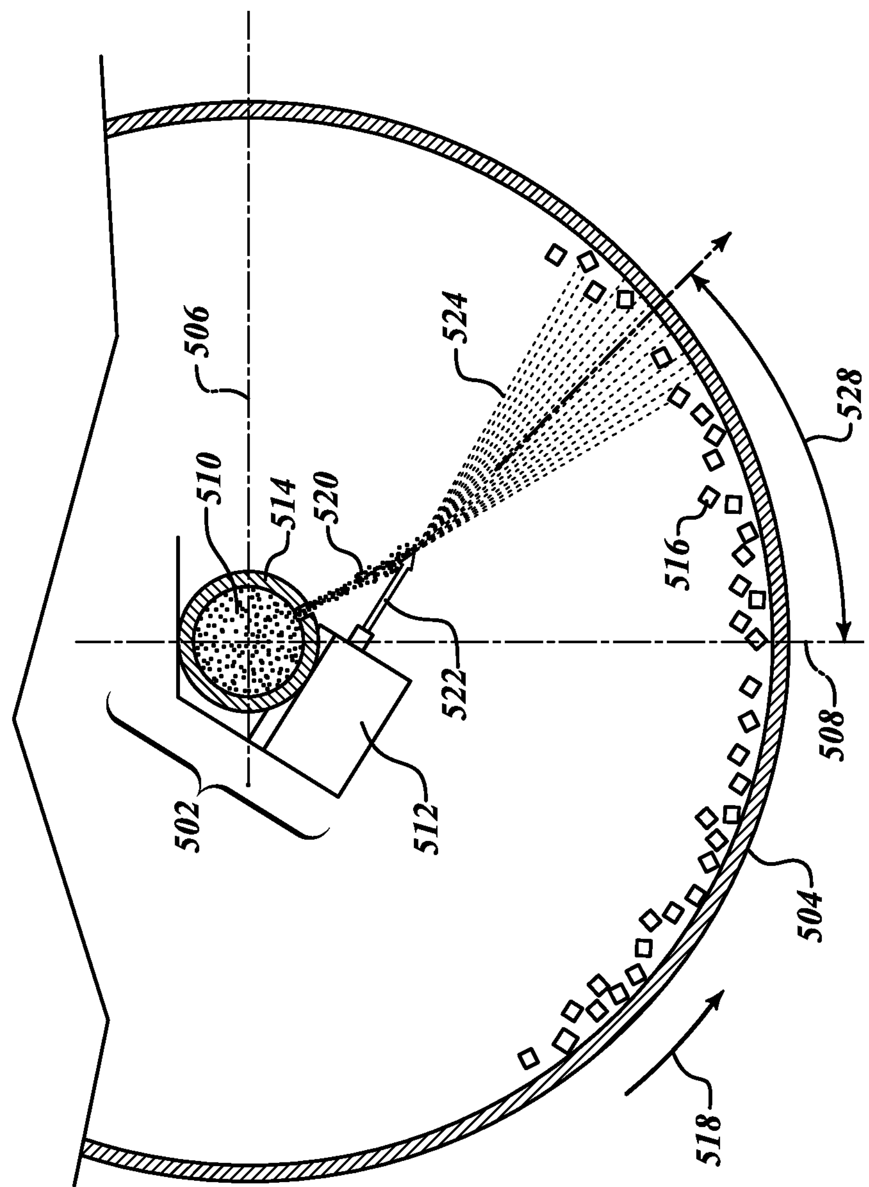
FIG. 3 is a cross-sectional view an application device in a blender according to some embodiments of the disclosure.

FIG. 3 shows a cross-sectional schematic view of an application device 502 in a blender 504 according to embodiments of the disclosure. The blender 504 has a generally cylindrical shape; therefore, the cross-sectional view is depicted as generally circular. Dotted lines on a plane parallel to the circular cross section divide the blender 504 into four quadrants for the purpose of illustrating the operation of some embodiments of the disclosure. A horizontal line 506 and a vertical line 508 intersect at a center point 510 which is the generally at the center of the circle forming the cross section of the blender 504.

In the embodiment shown, the application device 502 includes an air delivery system 512 and a binder delivery system 514. The air delivery system 512 may be an air knife, pipe, tube, or any other method known in the art for delivering air or an equivalent fluid. The binder delivery system 514 can be a pipe, tube, manifold, or other device capable of delivering the binder in the form of a foam according to the disclosure. In some embodiments, the air delivery system 512 and the binder delivery system 514 are integrated into one component such as a nozzle, pipe, air knife, an atomizer, or other device known in the art. The blender 504 may include a single application device 502 or multiple application devices at various locations.

FIG. 4 is a schematic view of an embodiment of the binder delivery system 514, which is part of the application device 502 in FIG. 3. In some embodiments, the binder delivery system 514 includes a generally cylindrical pipe 602 having an interior surface 604 and an exterior surface 606. Referring back to FIG. 3, the pipe 602 may be arranged on a center axis 608, which is in a plane perpendicular to the plane containing the horizontal line 506 and the vertical line 506. Referring again to FIG. 4, one or more holes 610 extend through the interior surface 604 to the exterior surface 606 of the pipe 602 for delivery of foam. In the embodiment shown, the holes 610 are arranged in a straight line; however other configurations are envisioned in this disclosure. In addition, the holes 610 may extend straight through the interior surface 604 to the exterior surface 606 or may be positioned at an angle.

Referring back to FIG. 3, wood particles 516 are delivered into the blender 504 by an inlet (not shown) and are tumbled as the blender 504 rotates. In the embodiment shown, the blender 504 rotates in a counter-clockwise direction as indicated by arrow 518. A binder foam stream 520 is delivered through the holes 610 (FIG. 4) and intersects with an air stream 522 from the air delivery system 512 to form a binder foam spray 524. The binder foam spray 524 has a center axis indicated by a line, which forms a spray angle 528 with respect to vertical line 508. In some embodiments the spray angle 528 is between about 1 degree and about 90 degrees. In a preferred embodiment, the spray angle 528 is about 45 degrees.

Figure 5:
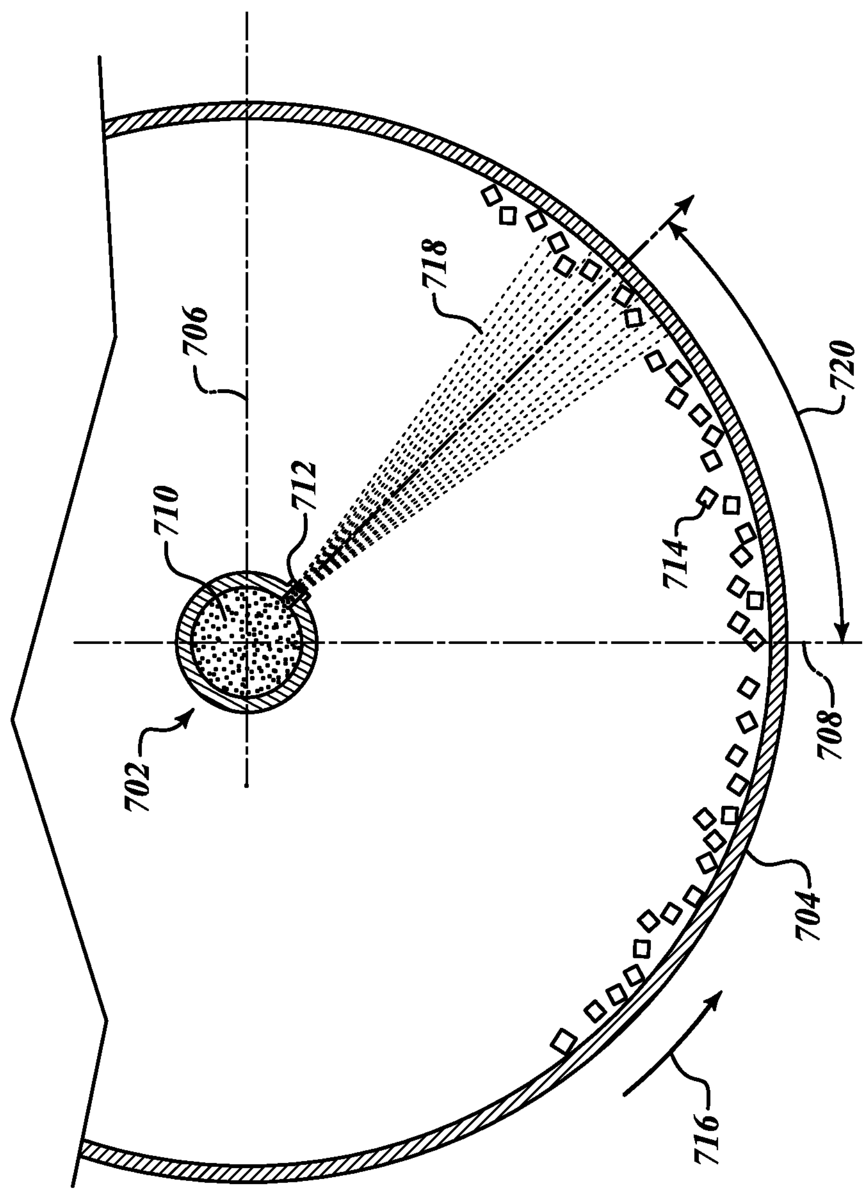
FIG. 5 is a cross-sectional view an application device in a blender according to some embodiments of the disclosure.

FIG. 5 shows a cross-sectional schematic view of an embodiment of an application device 702 according to embodiments of the disclosure. The application device 702 is arranged in a blender 704 having a generally cylindrical shape. Dotted lines on a plane parallel to the circular cross section divide the blender 704 into four quadrants for the purpose of illustrating the operation of some embodiments of the disclosure. A horizontal line 706 and a vertical line 708 intersect at a center point 710 which is the generally at the center of the circle forming the cross section of the blender 704.

In the embodiment shown, the application device 702 includes a plurality of nozzles 712. The blender 704 may include a single application device 702 or multiple application devices at various locations. Wood particles 714 are delivered into the blender 704 by an inlet (not shown) and are tumbled as the blender 704 rotates. In the embodiment shown, the blender 704 rotates in a counter-clockwise direction as indicated by arrow 716. A pressurization pump (not shown) delivers the foam through the plurality of nozzles 712 in a binder foam spray 718. In some embodiments, the binder foam spray 718 may be a powder. The binder foam spray 718 has a center axis indicated by a line, which forms a spray angle 720 with respect to the vertical line 708. In some embodiments the spray angle 720 is between about 1 degree and about 90 degrees. In a preferred embodiment, the spray angle 720 is about 45 degrees.

The application devices according to some embodiments of the disclosure are mechanically simple compared to spinning disk atomizers and other equipment used in conventional methods. In addition, applying a foamed binder according to some embodiments of the disclosure is expected to optimize the amount of binder that covers the cellulosic particles and minimize the amount of binder that builds up on the machinery causing operational problems. Thus, the overall cost of the manufacturing process may be reduced when compared to conventional methods.

Compared to conventional methods, blenders according to some embodiments of the disclosure may also be able to run at slower speeds thereby preventing mechanical failure and other operational problems. Blenders in a mill application typically run at about 12 RPM to about 28 RPM. Blenders according to embodiments of the disclosure are expected to run at about 6 RPM to about to about 16 RPM. Thus, methods according to the disclosure may require substantially less power than conventional methods and may be less likely to fail or require replacement parts.

From the foregoing, it will be appreciated that the specific embodiments of the disclosure have been described herein for purposes of illustration, but that various modifications may be made without deviating from the disclosure. For example, different formulations of binders, surfactants, and additives in different amounts may be used. In addition, modifications may be made to the equipment or processes disclosed.

Aspects of the disclosure described in the context of particular embodiments may be combined or eliminated in other embodiments. For example, methods for manufacturing a wood strand product according to the disclosure may be used in combination with binder formulations according to the disclosure or may be used with conventional binders. Likewise, binder formulations according to the disclosure may be used with conventional equipment.

Further, while advantages associated with certain embodiments of the disclosure may have been described in the context of those embodiments, other embodiments may also exhibit such advantages, and not all embodiments need necessarily exhibit such advantages to fall within the scope of the disclosure.

The following examples will serve to illustrate aspects of the present disclosure. The examples are intended only as a means of illustration and should not be construed to limit the scope of the disclosure in any way. Those skilled in the art will recognize many variations that may be made without departing from the spirit of the disclosure.

EXAMPLE

An experiment was conducted in order to comparatively evaluate the functional performance of the foamed binders, systems, and application methods according to the disclosure and conventional phenolic resins applied using conventional application methods. Oriented strand board (OSB) was produced on a laboratory-scale using methods according to the disclosure and conventional methods. OSB was produced using both core-layer strands and surface-layer strands. Various internal bond strength tests and swell tests were then performed on both the OSB produced according to methods in the disclosure and the conventional OSB.

Production of OSB Using Conventional Methods

Wooden strands (25-45 mils thick, 0.25-1.5 in a wide, 0.25-5.0 in long, aspen and poplar species) designated as "core-layer strands" were dried to a moisture content of about 5% and were then transferred into a front-load, cylindrical-shaped "blender" compartment (4 feet depth, 8 feet diameter). The rotation rate of the blender was set at 20 rpm, which was appropriate to cause the strands to be carried to the top of the interior region of the blender compartment and to then fall to the bottom of the compartment in a cascading, "waterfall-like" action. The blender was further equipped with a spray application system for molten neat wax as well as a spray application system for liquid bonding resins. A slack wax, known as Prowax 561 (manufactured by the Exxon-Mobil in Houston, Tex.), was heated to a temperature of 200° F. and then sprayed onto the wooden strands at a loading level of 0.75% based on the dry mass of the wood. An isocyanate-based bonding resin, known as Rubinate 1840 (manufactured by Huntsman Polyurethanes in The Woodlands, Tex.), was then sprayed onto the strands at a loading level of 6.0% based on the dry mass of the wood. The treated core-layer strands were then removed from the blender.

Wooden strands (25-45 mils thick, 0.25-1.5 in wide, 0.25-5.0 in long, aspen and poplar species) designated as "surface-layer strands" were dried to a moisture content of about 3% and were then loaded into the blender compartment. A slack wax, known as Prowax 561 (manufactured by the Exxon-Mobil in Houston, Tex.), was heated to a temperature of 200° F. and then sprayed onto the wooden strands at a loading level of 0.75% based on the dry mass of the wood. A conventional phenolic bonding resin known as OSF59FLM (manufactured by Hexion Specialty Chemicals, Inc in Edmonton, AB) was then sprayed onto the strands. The OSF59FLM control resin is representative of resins typically used in commercial production of OSB. The OSF59FLM control resin was applied to strands through a Coil EL4 Atomizer at 10,500 rpm at a rate of 1,650 g per minute. The blender drum rotation speed was 20 rpm. The OSF59FLM control resin had a percent solids value of 59% and a viscosity of 150 cps. Loading levels of 2.0%, 3.0% or 5.0% based on the solids content of the resin and the dry mass of the wood were used. The treated surface-layer strands were then removed from the blender.

The treated strands were formed on top of a screen and caul plate into a four-layered mat that was comprised of one bottom surface-layer, two middle core layers, and one top surface-layer. The length of the mat was 24 inches and the width of the mat was also 24 inches. The strands in the surface layers were oriented in a direction that was generally parallel to one of the major axis of the mat, while the strands in the surface layer were oriented in a direction that was generally parallel to the other major axis of the mat. The mass of each of the four layers was about 1050-1100 g. The thickness of the mat was about 5 inches after forming.

The mat, as well as the caul plate and screen that were supporting the mat, were then transferred onto the bottom platen of an 'open' hot-press. The top and bottom platens were maintained at a surface temperature of 410° F. The time required to achieve this compression process was about 60 seconds. The maximum pressure exerted on the mat was about 500-650 psi. The compressed mat was restrained at a constant thickness for a period of 190 seconds. The distance between the top and bottom platens was then gradually increased for the next 30 seconds in order to slowly relieve the externally applied pressure. The press was then fully opened and the hot OSB panel was transferred into an oven, which was maintained at a temperature of 80° C. for a period of 24 hours. The panel was then removed from the oven and placed into a conditioning chamber that was maintained at a relative humidity of 50% and a temperature of 20° C. for a period of at least one week. Three replicate panels were made in this manner for each of the loading levels (2%, 3%, and 5%).

Production of OSB Using Methods According to the Disclosure

Wooden strands (25-45 mils thick, 0.25-1.5 in a wide, 0.25-5.0 in long, aspen and poplar species) designated as "core-layer strands" were dried to a moisture content of about 5% and were then transferred into a front-load, cylindrical-shaped "blender" compartment (4 feet depth, 8 feet diameter). The rotation rate of the blender was set at 20 rpm, which was appropriate to cause the strands to be carried to the top of the interior region of the blender compartment and to then fall to the bottom of the compartment in a cascading, "waterfall-like" action. The blender was further equipped with a spray application system for molten neat wax as well as a spray application system for liquid bonding resins. A slack wax, known as Prowax 561 (manufactured by the Exxon-Mobil in Houston, Tex.), was heated to a temperature of 200° F. and then sprayed onto the wooden strands at a loading level of 0.75% based on the dry mass of the wood. An isocyanate-based bonding resin, known as Rubinate 1840 (manufactured by Huntsman Polyurethanes in The Woodlands, Tex.), was then sprayed onto the strands at a loading level of 6.0% based on the dry mass of the wood. The treated core-layer strands were then removed from the blender.

Wooden strands (25-45 mils thick, 0.25-1.5 in wide, 0.25-5.0 in long, aspen and poplar species) designated as "surface-layer strands" were dried to a moisture content of about 3% and were then loaded into the blender compartment. A slack wax, known as Prowax 561 (manufactured by the Exxon-Mobil in Houston, Tex.), was heated to a temperature of 200° F. and then sprayed onto the wooden strands at a loading level of 0.75% based on the dry mass of the wood. A phenolic foaming resin known as W1601 was then applied using methods according to the disclosure. The W1601 foaming phenol formaldehyde resin associated with methods according to the disclosure was manufactured by Hexion Specialty Chemicals, Inc in Springfield, Oreg. and had the following properties and characteristics. It had a pH level of 9.68, percent solids level of 47.5, specific gravity of 1.208, and a viscosity of 3,300 cps (measured by use of Gardner-Holdt bubble tubes at a temperature of 25° C.). The formaldehyde to phenol molar ratio was 2.5. The urea level was 3.04%. The caustic level was 6.45%.

An application system similar to the system depicted in FIGS. 3 and/or 5 was used to apply the foamed resin. The W1601 resin was first foamed using a continuous mixing head. The resulting foam was then transferred by use of a pump to a distribution spray bar (similar to FIG. 4) which disintegrated the foam and dispensed foam particles onto strands within a rotating blender. In this process the flow rate of the W1601 resin through the continuous mixing head was 2,000 wet grams per minute. An aqueous solution of cocamidopropyl betaine, known as Incronam 30 from Croda Inc in Edison, N.J. (36% solids) was used as the surfactant for the foaming resin. The surfactant was simultaneously injected into the mixing head at a rate of 19 wet grams per minute. Air was entrained in the blend of W1601 resin and surfactant at the mixing head at a level which resulted in a foam density of 11 pcf. The transfer pump exerted a pressure of about 500-600 psi on the foamed resin. The distribution spray bar consisted of 1 inch square, ⅛ inch wall, 52 inch long stainless steel square tubing with two nozzles spaced 21 inch apart that had an orifice diameter of 0.026 inch. The blender drum rotation speed was 10 rpm. The treated surface-layer strands were then removed from the blender. The spray angle used was approximately 45 degrees (e.g., see FIGS. 3 and 5).

The treated strands were formed on top of a screen and caul plate into a four-layered mat that was comprised of one bottom surface-layer, two middle core layers, and one top surface-layer. The length of the mat was 24 inches and the width of the mat was also 24 inches. The strands in the surface layers were oriented in a direction that was generally parallel to one of the major axis of the mat, while the strands in the surface layer were oriented in a direction that was generally parallel to the other major axis of the mat. The mass of each of the four layers was about 1050-1100 g. The thickness of the mat was about 5 inches after forming.

The mat, as well as the caul plate and screen that were supporting the mat, were then transferred onto the bottom platen of an 'open' hot-press. The top and bottom platens were maintained at a surface temperature of 410° F. The time required to achieve this compression process was about 60 seconds. The maximum pressure exerted on the mat was about 500-650 psi. The compressed mat was restrained at a constant thickness for a period of 190 seconds. The distance between the top and bottom platens was then gradually increased for the next 30 seconds in order to slowly relieve the externally applied pressure. The press was then fully opened and the hot OSB panel was then transferred into an oven, which was maintained at a temperature of 80° C. for a period of 24 hours. The panel was then removed from the oven and placed into a conditioning chamber that was maintained at a relative humidity of 50% and a temperature of 20° C. for a period of at least one week. Three replicate panels were made in this manner for each of the loading levels (2%, 3%, and 5%).

Internal Bond Strength Testing

Twelve internal bond test specimens (2 inch×2 inch) were cut from each conditioned laboratory panel produced according to the different methods described above. Each test specimen was subjected to an 'as-is' internal bond strength test in accordance with ASTM D1037. Test results are shown in Table 1.

TABLE 1

Internal Bond values for OSB made according to embodiments of the disclosure and using conventional methods

| Surface Resin | 2% Loading | 3% Loading | 5% Loading |
|---|---|---|---|
| W1601 Foamed Resin | 46 psi (1.54) | 64 psi (2.01) | 93 psi (2.54) |
| OSF59FLM Control Resin | 39 psi (1.91) | 62 psi (2.32) | 87 psi (3.66) |

(Standard Deviation)

Swell Testing

Three 6 inch×6 inch test specimens were cut from each conditioned laboratory panel. Each test specimen was subjected to 24 hour water soak in accordance with ASTM D1037. Test results for percent water absorption are shown in Table 2. Test results for 24 hour water soak percent thickness swell 1 inch in from the edge in accordance with ASTM D1037. Test results are shown in Table 3.

TABLE 2

24 hour percent water absorption values for OSB made according to embodiments of the disclosure and using conventional methods

| Surface Resin | 2% Loading | 3% Loading | 5% Loading |
|---|---|---|---|
| W1601 Foamed Resin | 26% | 23% | 22% |
| OSF59FLM Control Resin | 27% | 25% | 23% |

TABLE 3

24 hour percent thickness swell 1 inch in from edge values for OSB made according to embodiments of the disclosure and using conventional methods

| Surface Resin | 2% Loading | 3% Loading | 5% Loading |
|---|---|---|---|
| W1601 Foamed Resin | 13% | 12% | 8.6% |
| OSF59FLM Control Resin | 14% | 10% | 8.6% |

The test results shown in Table 1, Table 2, and Table 3 help to demonstrate the functional performance of foamed binders and application methods according to the disclosure. When compared to conventional methods, systems and methods according to embodiments of the disclosure exhibit some improvement in average properties, as well as less variance.

Internal Bond Strength for Methods According to Disclosure in Which a Powder was Formed The W1601 foamed resin when sprayed from the distribution bar exhibited both liquid droplets and also powder. This small amount of powder resin produced during spraying was evident in the internal bond results of specimens with folded strands. Table 4 shows the higher IB results of specimens made with the W1601 foamed resin where the powder resin was able to get into the curled strand and give bonding strength where a liquid droplet is unable to get inside the curled strand. Powder was observed in the blender after blending the W1601 foaming resin but was not present after blending the OSF59FLM control resin.

TABLE 4

Internal Bond values for OSB made with W1601 foamed resin and OSF59FLM control resin in the surface layers for specimens with folded strands at 5% resin loading

| Surface Resin | 5% Loading |
|---|---|
| W1601 Foamed Resin | 93 psi (2.54) |
| OSF59FLM Control Resin | 87 psi (3.66) |

When compared to conventional methods, it was observed that methods according to the disclosure exhibited less resin buildup on the blender walls and flights inside the blender after blending. This may help reduce maintenance costs in OSB manufacturing by enabling longer use of equipment.

We claim:

1. A method for producing an oriented strand board from cellulosic particles and an exterior resin binder, the method comprising the steps of:

mechanically foaming a phenol formaldehyde exterior resin binder to produce an uncured foam using a foaming device configured to agitate liquid resin with gas, wherein the phenol formaldehyde binder is an aqueous resole having a pH level greater than about 7.0 and a formaldehyde/phenol molar ratio greater than about 1.0, and wherein foaming the phenol formaldehyde binder to produce the foam further comprises blending the phenol formaldehyde binder and a surfactant for mechanical foam stabilization, the surfactant being selected from the group consisting of anionic, amphoteric, and nonionic surfactants;

tumbling the cellulosic particles in a rotary blender;

applying the uncured foam made in the foaming device to the cellulosic particles in the rotary blender;

blending the cellulosic particles and the uncured foam so that the foam substantially covers the cellulosic particles; and consolidating the cellulosic particles and curing the uncured foam using heat and pressure in a pressing device, wherein the pH of the uncured foam in the consolidation process is greater than about 7.0.

2. The method of claim 1 wherein foaming the phenol formaldehyde binder to produce the foam further comprises blending the phenol formaldehyde binder and the surfactant for mechanical foam stabilization.

3. The method of claim 1 wherein the phenol formaldehyde binder has an initial volume before foaming and a final volume after foaming, the final volume being at least 5 times greater than the initial volume.

4. The method of claim 1 wherein the foam has a percent solids range of about 35% to about 65%, a caustic level of about 5.0% to about 8.0%, and a viscosity of about 1000 centipoise to about 4000 centipoise.

5. The method of claim 4 wherein the foam has a urea level of about 0.01% to about 35%.

6. The method of claim 1 wherein the step of applying the foam to the cellulosic particles in the blender is performed by an application device, the application device comprising a plurality of nozzles configured to spray the foam onto the cellulosic particles.

7. The method of claim 6 wherein the step of applying the foam further comprises compressing the foam and dispensing the foam through the plurality of nozzles.

8. The method of claim 1 wherein the oriented strand board is selected from the group consisting of oriented strand board, oriented strand lumber, laminated strand lumber, and parallel strand lumber.

9. A method for producing an oriented strand board from cellulosic particles and an exterior resin binder, the method comprising:

mechanically foaming a phenol formaldehyde exterior resin binder to produce an uncured foam using a foaming device configured to agitate liquid resin with gas, wherein the phenol formaldehyde binder is an aqueous resole having a pH level greater than about 7.0 and a formaldehyde/phenol molar ratio greater than about 1.0, and adding a surfactant to the binder for mechanical foam stabilization, wherein the surfactant is selected from the group consisting of anionic, amphoteric, and nonionic surfactants;

tumbling the cellulosic particles in a rotary blender;

applying the uncured foamed binder to the cellulosic particles in the rotary blender, wherein the uncured foamed binder has a loading level in the range of 2% to 5%;

blending the cellulosic particles and the uncured foamed binder; and consolidating the cellulosic particles and curing the uncured foam binder using heat and pressure in a pressing device, wherein the pH of the uncured foam in the consolidation process is greater than about 7.0.

10. A method for producing an oriented strand board from cellulosic particles and an exterior resin binder, the method comprising:

tumbling the cellulosic particles in a rotary blender;

mechanically foaming a phenol formaldehyde exterior resin binder using a foaming device configured to agitate liquid resin with gas to produce an uncured foamed binder, wherein the phenol formaldehyde binder is an aqueous resole having a pH level greater than about 7.0 and a formaldehyde/phenol molar ratio greater than about 1.0, and wherein the binder includes a surfactant for mechanical foam stabilization selected from the group consisting of anionic, amphoteric, and nonionic surfactants;

applying the uncured foamed binder to the cellulosic particles in the rotary blender using an application device including a plurality of nozzles configured to spray uncured foamed binder on the strands;

blending the cellulosic particles and the uncured foamed binder; and consolidating the cellulosic particles and curing the uncured foam binder under heat and pressure in a pressing device, wherein the pH of the uncured foam in the consolidation process is greater than about 7.0.

11. The method of claim 10, wherein the rotary blender has a center axis and the application device has a rotary axis, and wherein the application device is operably coupled to the rotary blender so that the center axis is parallel to the rotary axis.

12. The method of claim 11, wherein the application device has a spray angle perpendicular to the rotary axis in the range of about 1 to about 90 degrees.

13. The method of claim 10, wherein the application device further includes a pressurization pump.

14. The method of claim 10, wherein the binder is mechanically foamed using the foaming device before being applied to the cellulosic particles in the rotary blender.

15. The method of claim 2 wherein the surfactant is nonionic.

16. A method for producing an oriented strand board from cellulosic particles and an exterior resin binder, the method comprising the steps of:

mechanically foaming a phenol formaldehyde exterior resin binder to produce an uncured foam using a foaming device configured to agitate liquid resin with gas, wherein the phenol formaldehyde binder is an aqueous resole having a pH level greater than about 7.0 and a formaldehyde/phenol molar ratio greater than about 1.0, and wherein foaming the phenol formaldehyde binder to produce the foam further comprises blending the phenol formaldehyde binder and a surfactant for mechanical foam stabilization, the surfactant being selected from the group consisting of anionic, amphoteric, and nonionic surfactants;

tumbling the cellulosic particles in a rotary blender;

applying the uncured foam made in the foaming device to the cellulosic particles in the rotary blender;

blending the cellulosic particles and the uncured foam so that the foam substantially covers the cellulosic particles;

consolidating the cellulosic particles and curing the uncured foam using heat and pressure in a pressing device; and using the consolidated product as oriented strand board in an exterior application.

* * * * *